(12) United States Patent
Froula et al.

(10) Patent No.: US 10,897,115 B2
(45) Date of Patent: Jan. 19, 2021

(54) SYSTEMS AND METHODS FOR SPATIOTEMPORAL CONTROL OF A LASER AND APPLICATIONS OF SAME

(71) Applicant: University of Rochester, Rochester, NY (US)

(72) Inventors: Dustin H. Froula, Rochester, NY (US); Terrance Kessler, Rochester, NY (US)

(73) Assignee: University of Rochester, Rochester, NY (US)

( * ) Notice: Subject to any disclaimer, the term of this patent is extended or adjusted under 35 U.S.C. 154(b) by 205 days.

Patent file contains an affidavit/declaration under 37 CFR 1.130(b).

(21) Appl. No.: 15/721,900

(22) Filed: Sep. 30, 2017

(65) Prior Publication Data
US 2019/0103720 A1  Apr. 4, 2019

(51) Int. Cl.
| | |
|---|---|
| H01S 3/00 | (2006.01) |
| H01S 3/097 | (2006.01) |
| H01S 3/23 | (2006.01) |
| G01J 11/00 | (2006.01) |
| H01S 3/30 | (2006.01) |

(Continued)

(52) U.S. Cl.
CPC ............ *H01S 3/0057* (2013.01); *G01J 11/00* (2013.01); *H01S 3/09705* (2013.01); *H01S 3/09716* (2013.01); *H01S 3/104* (2013.01); *H01S 3/2308* (2013.01); *H05H 15/00* (2013.01); *G02B 5/1814* (2013.01); *G02B 5/1866* (2013.01); *G02B 5/1876* (2013.01); *H01S 3/0014* (2013.01); *H01S 3/305* (2013.01); *H01S 2301/06* (2013.01); *H01S 2301/08* (2013.01)

(58) Field of Classification Search
CPC .. G02B 5/1814; G02B 5/1876; G02B 5/1866; G02B 27/40
See application file for complete search history.

(56) References Cited

U.S. PATENT DOCUMENTS

| | | | | |
|---|---|---|---|---|
| 5,212,501 A | * | 5/1993 | Nakamura | G02B 5/1876 347/247 |
| 6,052,354 A | * | 4/2000 | Gudesen | G11B 7/0033 369/112.07 |

(Continued)

OTHER PUBLICATIONS

Sainte-Marie et al. "Controlling the velocity of ultrashort light pulses in vacuum through spatio-temporal couplings", available on the website arxiv.org/abs/1708.0621 since Aug. 21, 2017 (retrieved Nov. 27, 2019).*

*Primary Examiner* — Eric L Bolda
(74) *Attorney, Agent, or Firm* — Hodgson Russ LLP

(57) ABSTRACT

Methods and systems are disclosed for using a chromatic lens system to provide a "flying focus"—i.e., an advanced focusing scheme enabling spatiotemporal control of a focal location. In a method, a photon beam is emitted from a source at a wavelength. The photon beam may have more than one wavelength. The photon beam is focused to a focal location using a chromatic lens system. The focal location is at a first longitudinal distance along an optical axis from the chromatic lens system. The wavelength of the photon beam is changed as a function of time to change the focal location as a function of time. The wavelength may be changed such that the focal location changes with a focal velocity.

20 Claims, 13 Drawing Sheets

(51) Int. Cl.
  *G02B 5/18*    (2006.01)
  *H01S 3/104*   (2006.01)
  *H01S 3/0971*  (2006.01)
  *H05H 15/00*   (2006.01)

(56) References Cited

U.S. PATENT DOCUMENTS

| | | | |
|---|---|---|---|
| 9,203,208 B2 * | 12/2015 | Schmidt | G02F 1/39 |
| 2002/0021723 A1 * | 2/2002 | Amako | B23K 26/0604 |
| | | | 372/23 |
| 2007/0280613 A1 * | 12/2007 | Inoue | G02F 1/365 |
| | | | 385/122 |
| 2016/0266466 A1 * | 9/2016 | Milchberg | G02F 1/3511 |

\* cited by examiner

US 10,897,115 B2

SYSTEMS AND METHODS FOR SPATIOTEMPORAL CONTROL OF A LASER AND APPLICATIONS OF SAME

STATEMENT REGARDING FEDERALLY SPONSORED RESEARCH

This invention was made with government support under contract nos. DE-SC0016253 and DE-NA0001944 awarded by the Department of Energy. The government has certain rights in the invention.

FIELD OF THE DISCLOSURE

The disclosure generally relates to optical systems, and more particularly, to optical systems for producing focused photon beams.

BACKGROUND OF THE DISCLOSURE

The controlled coupling of a laser to a plasma has the potential to address grand scientific challenges. However, previous techniques suffer from limited flexibility and poor control over the laser focal volume. In conventional near-diffraction-limited systems, both the minimum focal-spot size ($w_0 \propto f^\# \lambda$) and longitudinal focusing range ($Z_R \propto (f^{\#2}\lambda)$) are linked by the ratio of the focal length to twice the beam radius ($f^\# = f/2R$). As a result, these systems require large laser spots to extend their focusing range or waveguides to maintain small spots over long distances.

BRIEF SUMMARY OF THE DISCLOSURE

The present disclosure may be embodied as a method of spatiotemporally changing a focal location of a photon beam as a function of time. A photon beam emitted from a source is provided. The photon beam has a wavelength ($\lambda$). The photon beam may have more than one wavelength. The photon beam is focused to a focal location using a chromatic lens system. The focal location is at a first longitudinal distance (z) along an optical axis from the chromatic lens system. Where the photon beam has more than one wavelength, the chromatic lens system may be selected to define a focal location for each wavelength which is different than the focal locations of other wavelengths. The wavelength of the photon beam is changed as a function of time to change the focal location as a function of time. The wavelength may be changed such that the focal location changes with a focal velocity (v). The focal location (z) may be changed over time (z(t)) by changing the wavelength of the photon beam according to $$\lambda(\tau) = \lambda_0 \left[1 - \frac{z(\tau)}{f_0}\right]^{-1},$$

where the chromatic lens system has a longitudinal dispersion given by $$\frac{dz}{d\lambda} \cong -\frac{f_0}{\lambda_0},$$

where $\lambda_0$ is a central wavelength and $f_0$ is a focal length at the central wavelength.

The chromatic lens system may include a diffractive lens. The diffractive lens may have a radially varying groove density $$G = \frac{r}{\lambda_0 f_0},$$

where r is a radial distance from the optical axis, $\lambda_0$ is a central wavelength, and $f_0$ is a focal length at the central wavelength. The chromatic lens system may include a chromatic refractive lens. The chromatic lens system may include a diffractive lens and a refractive lens. The chromatic lens system may be nonlinear.

The source may be a broadband laser. The laser may use optical parametric chirped-pulse-amplification where $$\frac{d\lambda}{d\tau} \cong \frac{\Delta\lambda}{T} \cong \text{constant}$$

and $\Delta\lambda$ is the laser's bandwidth and T is its total pulse length. The wavelength of the photon beam may be changed using one or more modulators to enable a rate of change in the laser frequencies to be changed to generate a nonlinear chirp. The source may be a plurality of single-wavelength lasers. The plurality of single-wavelength lasers may be combined using a grating to generate the photon beam.

The present disclosure may be embodied as an apparatus for providing a flying focus. The apparatus includes a photon beam source and a chromatic lens system configured to receive a photon beam from the photon beam source. The chromatic lens system focuses the photon beam at a focal location. A controller is configured to change a wavelength of the photon beam as a function of time to change the focal location as a function of time.

The photon beam may include more than one wavelength. The controller may be configured to change the wavelength of the photon beam by selecting a subset of the wavelengths. The photon beam source may be a broadband laser. The broadband laser may use optical parametric chirped-pulse-amplification. The photon beam source may include a plurality of single-wavelength lasers. The photon beam source may further include a grating to combine the lasers of the plurality of lasers.

The chromatic lens system may include a diffractive lens. The diffractive lens may have a radially varying groove density $$G = \frac{r}{\lambda_0 f_0},$$

where r is a radial distance from the optical axis, $\lambda_0$ is a central wavelength, and $f_0$ is a focal length at the central wavelength. The chromatic lens system may include a chromatic refractive lens. The chromatic lens system may include a diffractive lens and a refractive lens. The chromatic lens system may be nonlinear.

The present disclosure may be embodied as a method for accelerating one or more particles. A photon beam emitted from a source is provided, the photon beam having a wavelength ($\lambda$). One or more particles are injected into a medium at a particle group velocity. The one or more particles may be photons, electrons, ions, etc. The photon beam is focused to a focal location using a chromatic lens system. The wavelength of the photon beam is changed to change the focal location and match the particle velocity. The method may further include ionizing the medium using the photon beam such that the photon beam induces an ionization wave front (with an ionization wave front velocity) in the medium. The one or more particles are injected at the ionization wave front and the photon beam wavelength is changed such that the ionization wave front velocity matches the particle group velocity.

The method may further include creating a density perturbation in a plasma of the medium using the photon beam. The density perturbation may have a velocity (i.e., the location of the density perturbation in the medium may be changed at a velocity). In such embodiments, the one or more particles may be charged particles injected at the density perturbation and the photon beam wavelength is changed such that the velocity of the density perturbation matches the particle group velocity.

The present disclosure may be embodied as a method for amplifying a photon beam. A pump beam emitted from a first source is provided. The pump beam has a pump beam wavelength (λ1). A seed photon beam emitted from a second source is provided. The seed photon beam has a seed photon wavelength (λ2). A medium is ionized using the pump beam such that the pump beam induces an ionization wave front with an ionization wave front velocity in the medium. The pump beam and the ionization wave front propagate through the medium in substantially a same direction. The seed photon beam is focused to a seed beam focal location in the medium using a chromatic lens system. The seed photon beam propagates through the medium in a direction substantially opposite to the direction of the pump beam. The second photon beam wavelength (λ2) is changed as a function of time to change the seed beam focal location as a function of time. A difference between a frequency of the pump beam and a frequency of the seed photon beam may be substantially equal to a frequency of the ionization wave front. 34. The function of time may be selected such that the change in the seed beam focal location as a function of time matches the ionization wave front velocity. The function of time may be selected such that a portion of the energy of the pump beam is transferred to the seed photon beam.

The present disclosure may be embodied as a method for generating an electromagnetic beam. The method includes providing a first photon beam emitted from a first source wherein the first photon beam has a first photon beam wavelength (λ1) and falls incident on a target spot. A second photon beam emitted from a second source is provided wherein the second photon beam has a second photon beam wavelength (λ2). The second photon beam is focused to a second photon beam focal location using a chromatic lens system. The second photon beam falls substantially incident on the target spot. The first photon beam and the second photon beam interfere, emitting electromagnetic radiation substantially towards a sensor. The second photon beam wavelength (λ2) is changed as a function of time to change the focal location as a function of time. The emitted electromagnetic radiation may be in a terahertz range of the electromagnetic spectrum. The first source and the second source may be located proximate to the sensor such that the electromagnetic radiation is emitted in a direction substantially opposite to a propagation direction of the first and/or second beam.

DESCRIPTION OF THE DRAWINGS

For a fuller understanding of the nature and objects of the disclosure, reference should be made to the following detailed description taken in conjunction with the accompanying drawings, in which.

(curves, top axis) focal-spot velocity plotted as a function of the pulse duration of the laser, wherein the open (closed) symbols and dashed (solid) curves represent a positively (negatively) chirped laser pulse. For all but two of the data points, the error in the velocity measurements is smaller than the symbols (<2.5%). For the data point with a pulse duration of 14 ps (very close to the L/c), the error in the velocity measurement is large since the focal velocity is nearly 50× the speed of light.

Figure 5:
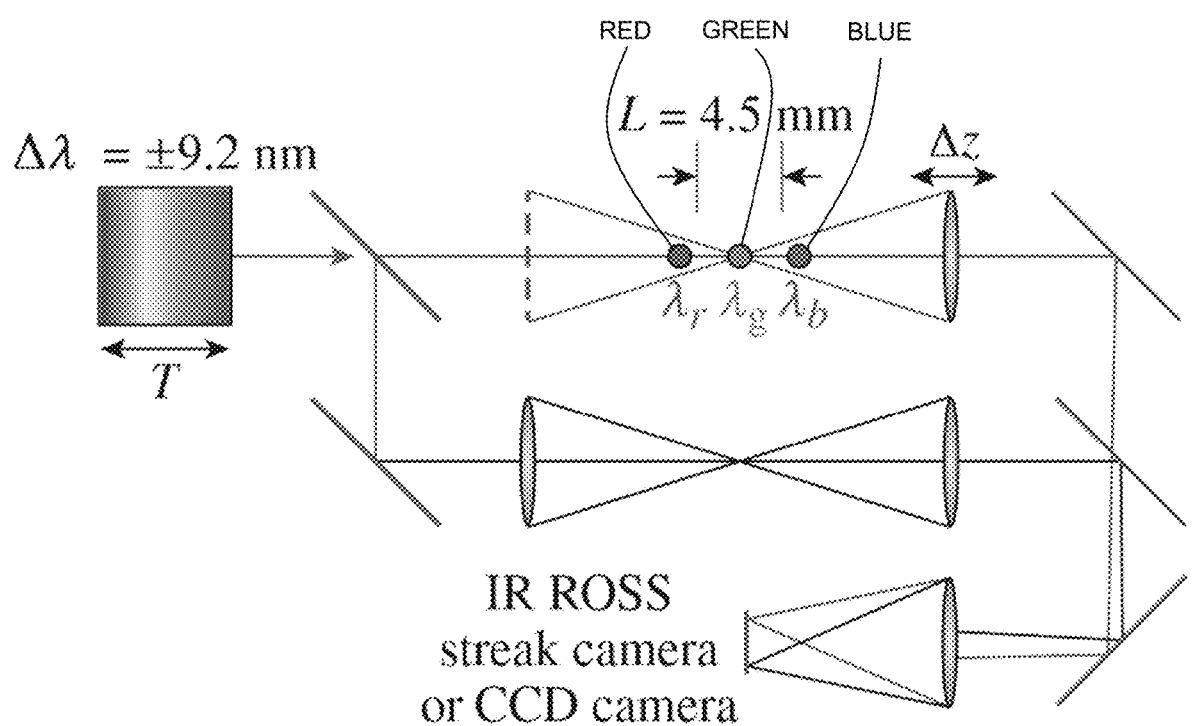
Figure 6:
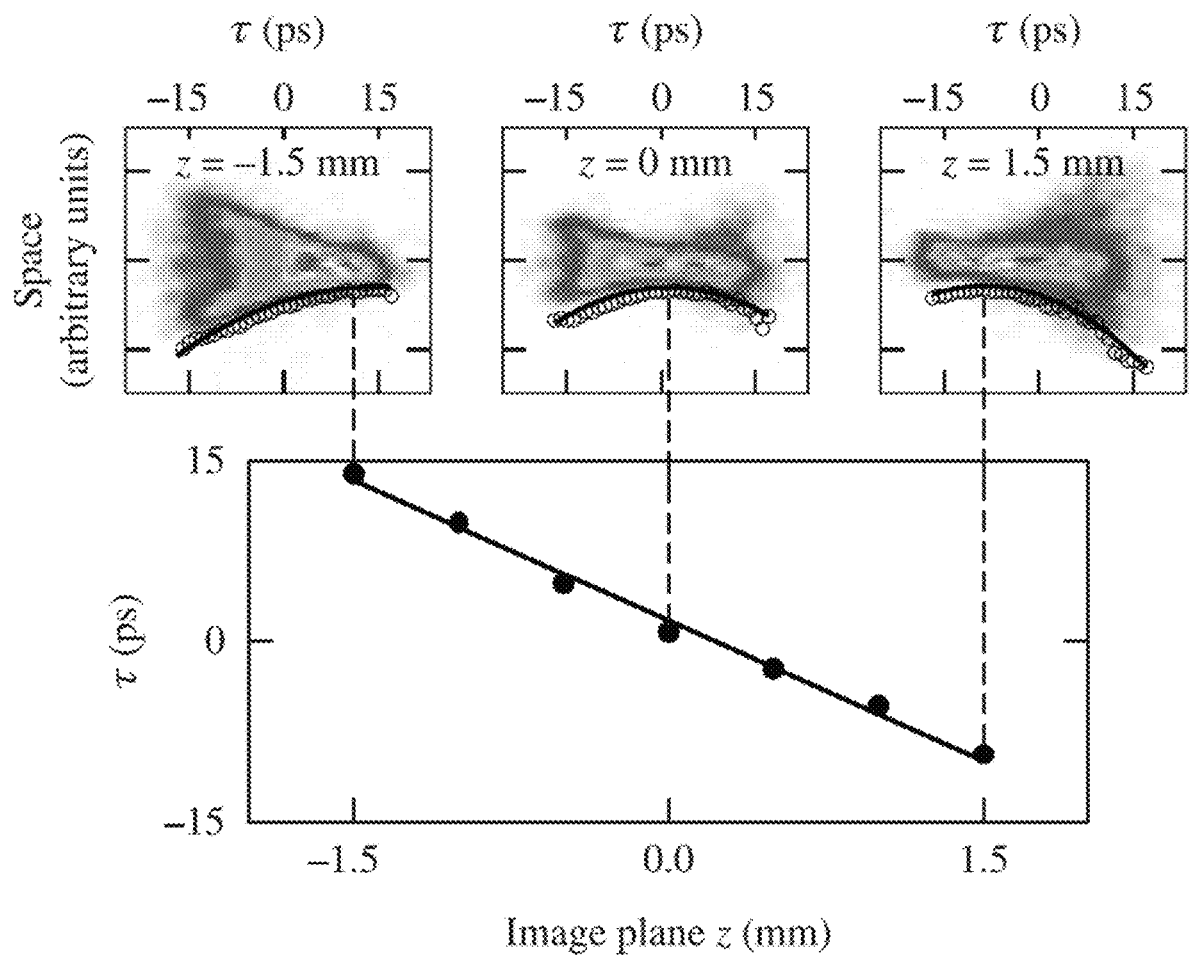

FIG. 5 is a schematic of an experimental setup according to an embodiment of the present disclosure;

FIG. 6 depicts three streak camera images recorded for a pulse duration of T=36.4 ps, where the image plane was focused at: (a) z=−1.5 mm; (b) z=0 mm; and (c) z=1.5 mm. Plotted over each image is the corresponding full-width-at-0.2× the peak-power spot size as a function of time. (d) The solid curve is a best fit to the data used to determine the time of minimum spot size (c). The measured times are shown for this data set. The best fit line indicates a focal-spot velocity of v/c=−0.77±0.015.

Figure 7A:
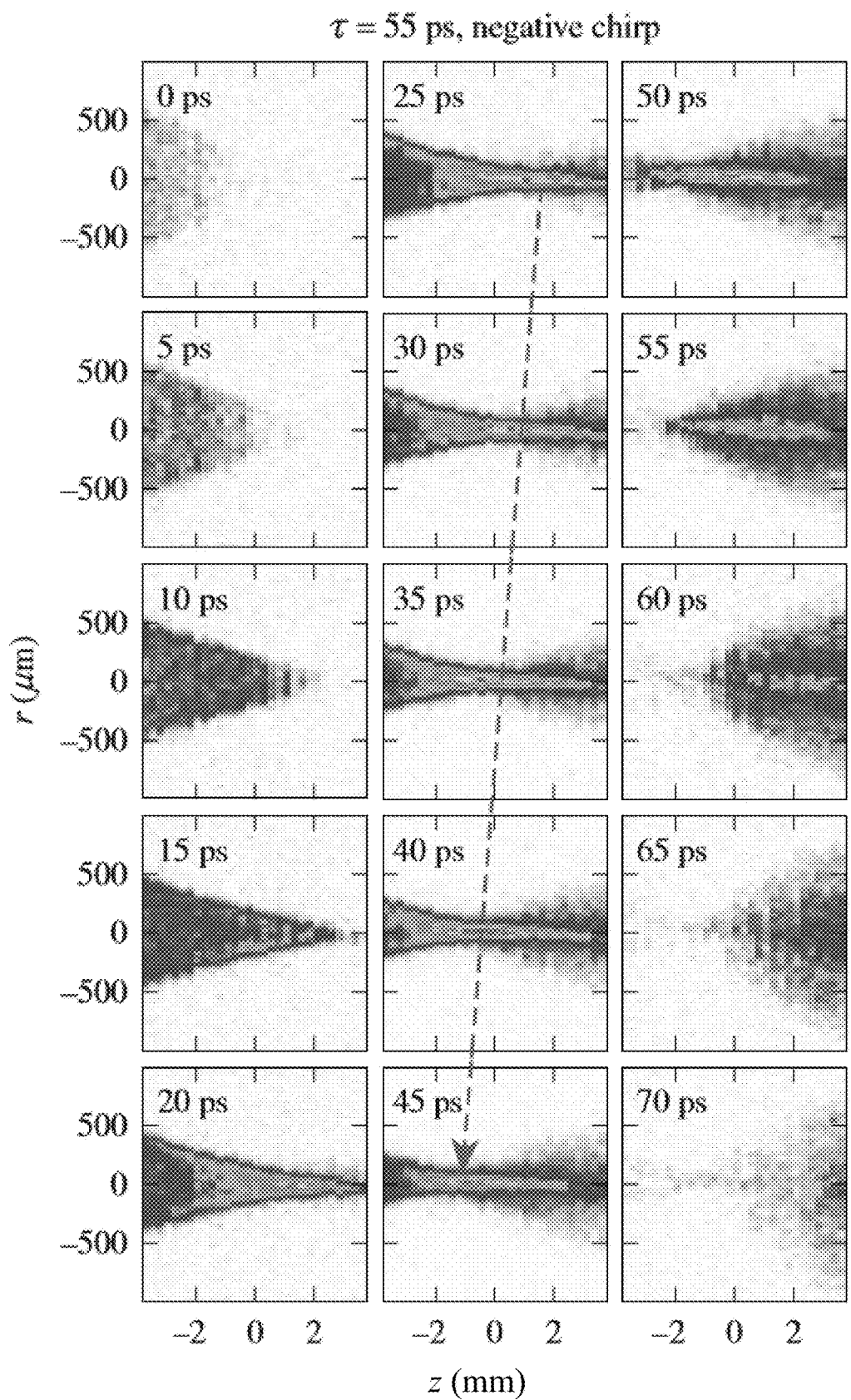

FIG. 7A depicts the evolution of the flying focus intensity measured for a negative chirped pulse with a duration of T~60 ps. The laser is shown propagating into the measurement window (top left) at 0 ps. In the negatively chirped case shown, the laser is far from focus at the left edge of the window (z~−2.5 mm). At t=25 ps (top middle), the laser has reached focus at the back of the window (z~+2 mm). Over the next few frames the focus propagates ~−2 mm in ~20 ps, corresponding to −0.3c.

Figure 7B:
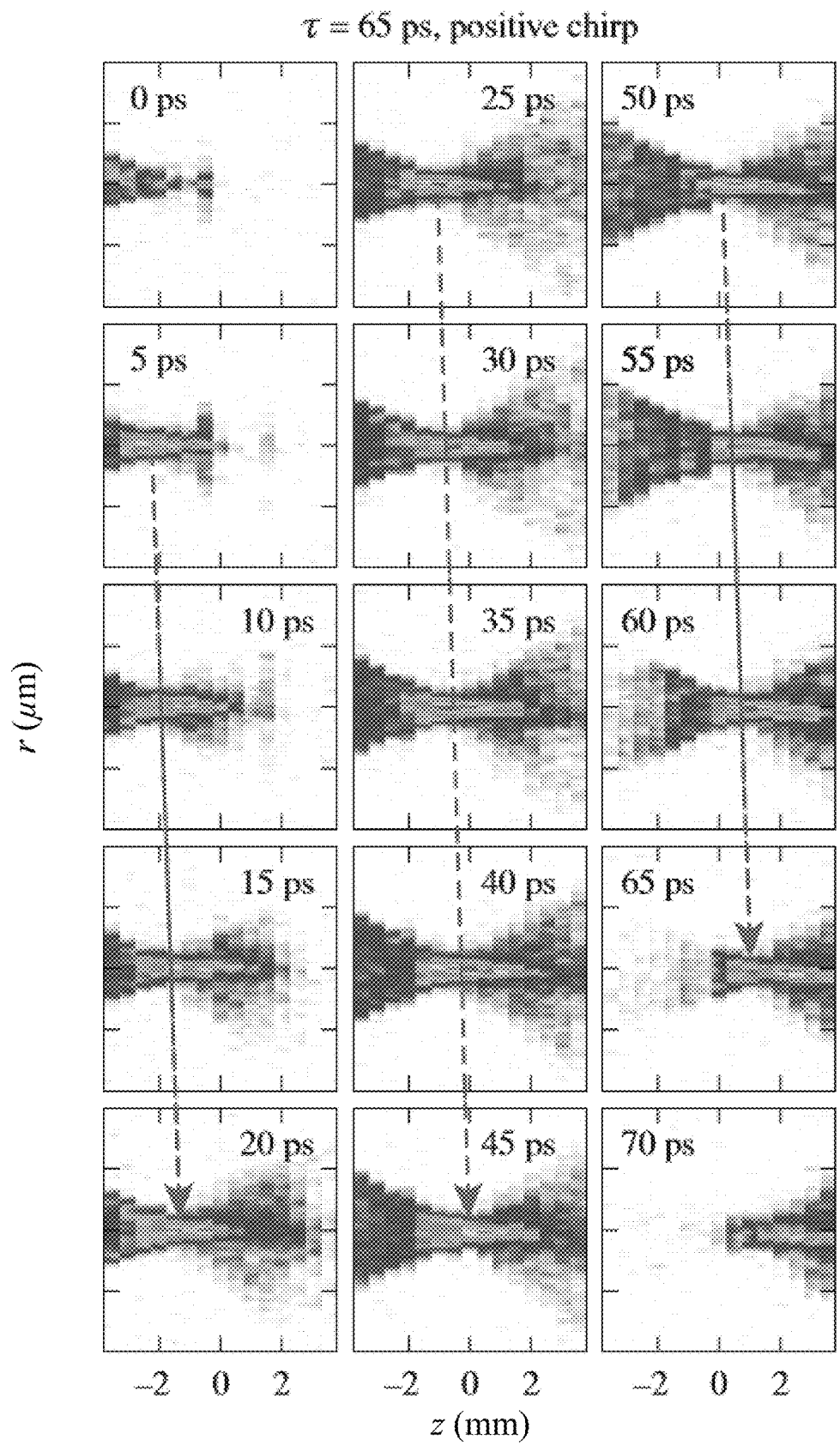

FIG. 7B depicts the evolution of the flying focus intensity measured for a positive chirped pulse with a duration of T~60 ps. The laser is shown propagating into the measurement window (top left) at 0 ps. In the positively chirped case shown, the laser comes into focus at the left edge of the window (z~−2.5 mm), in contrast to the negatively chirped case of FIG. 7A. Over the next few frames, the positively chirped pulse moves forward slowly at ~+0.2c.

Figure 8:
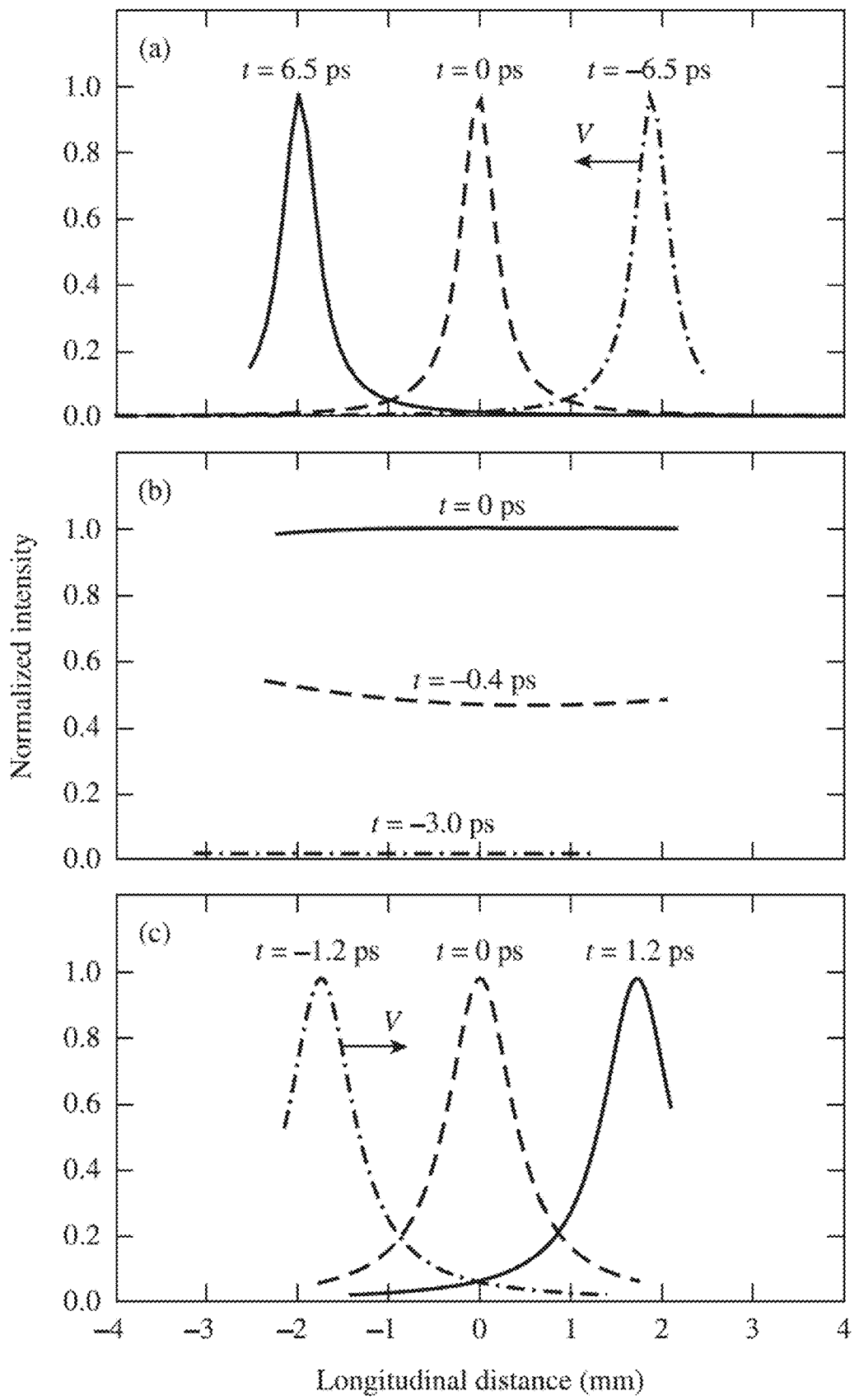

FIG. 8 depicts graphs wherein the instantaneous longitudinal intensity is plotted for a focus (a) counter-propagating at the speed of light (T=2L/c=29.8 ps, Δλ=−9.2 nm), (b) propagating at an "infinite" velocity (T=L/c=14.9 ps, Δλ=−

9.2 nm) and (c) co-propagating at 5× the speed of light (T=0.8L/c=11.9 ps, Δλ=−9.2 nm). Snapshots of the intensity profiles at (dotted-dashed curves) early time, (dashed curves) middle time, and (solid curves) late time.

Figure 9A:
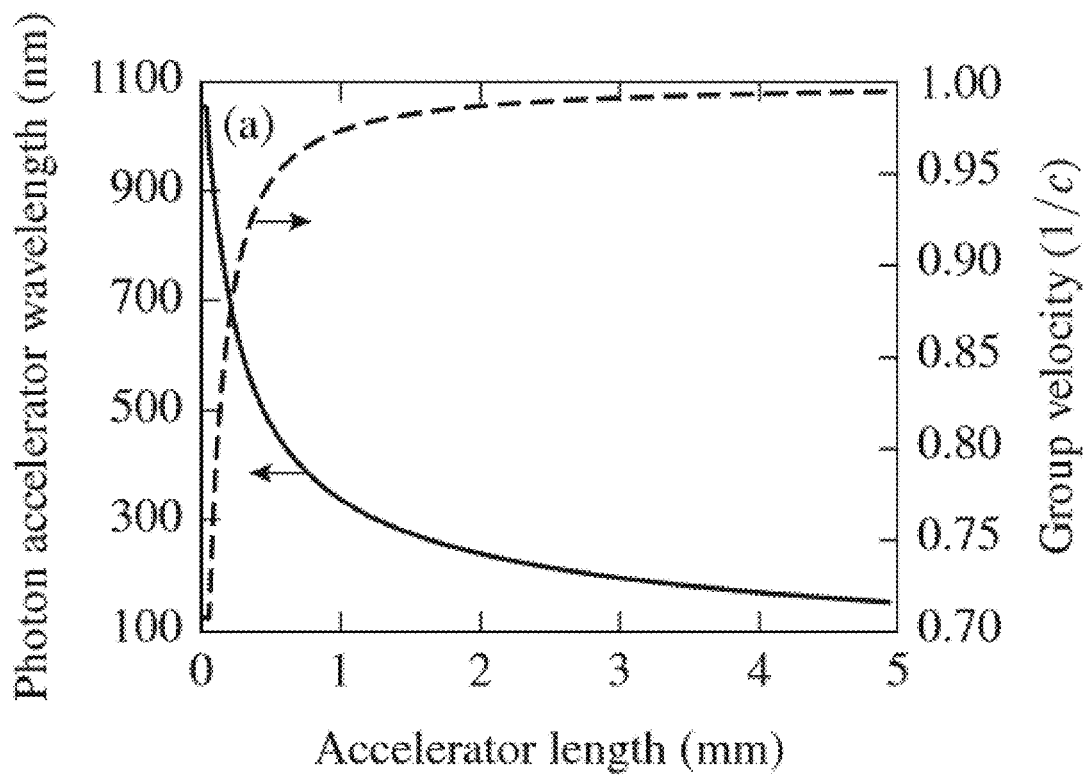

FIG. 9A is a graph showing the velocity of the accelerating photons and their wavelength [(right axis) Eq. (6), $\Delta\lambda_0' = \Delta\omega/\omega_0$] plotted as a function of accelerator length for a system where an ionization wave is produced by an accelerating flying focus. The electron density was assumed to rise from vacuum to $n_e = 5 \times 10^{20}$ cm$^{-3}$ over the Rayleigh length of the flying focus ($Z_R = 0.05$ mm).

Figure 9B:
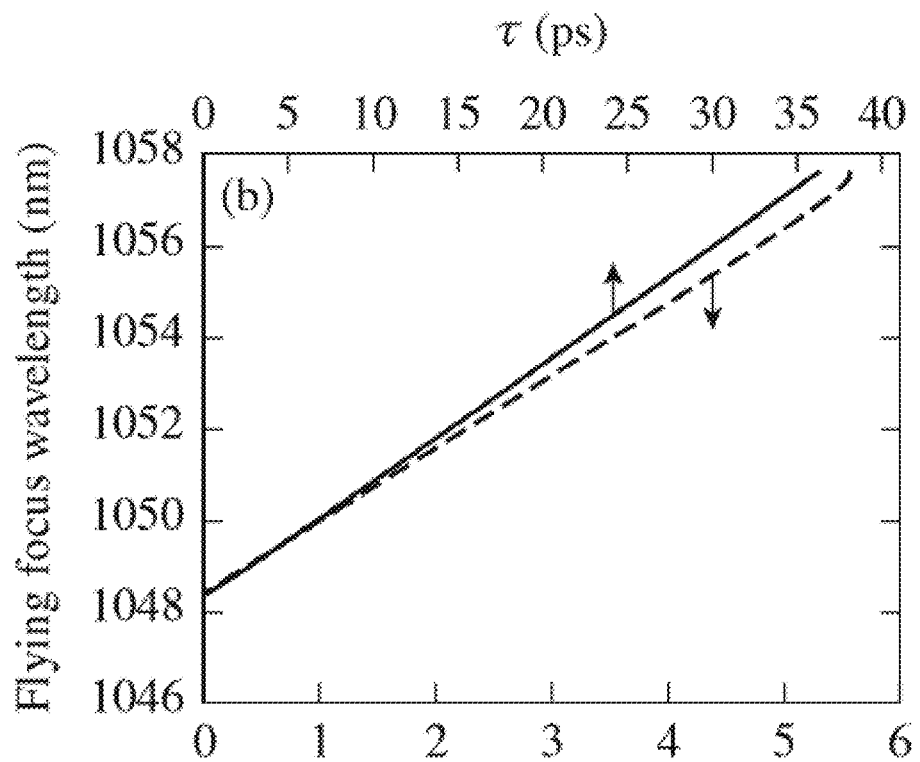

FIG. 9B is a graph showing an exemplary nonlinear chirp provided for the flying focus to accelerate in phase with the frequency-shifted photons toward a diffractive lens (bottom axis) and away from the diffractive lens (top axis).

Figure 10:
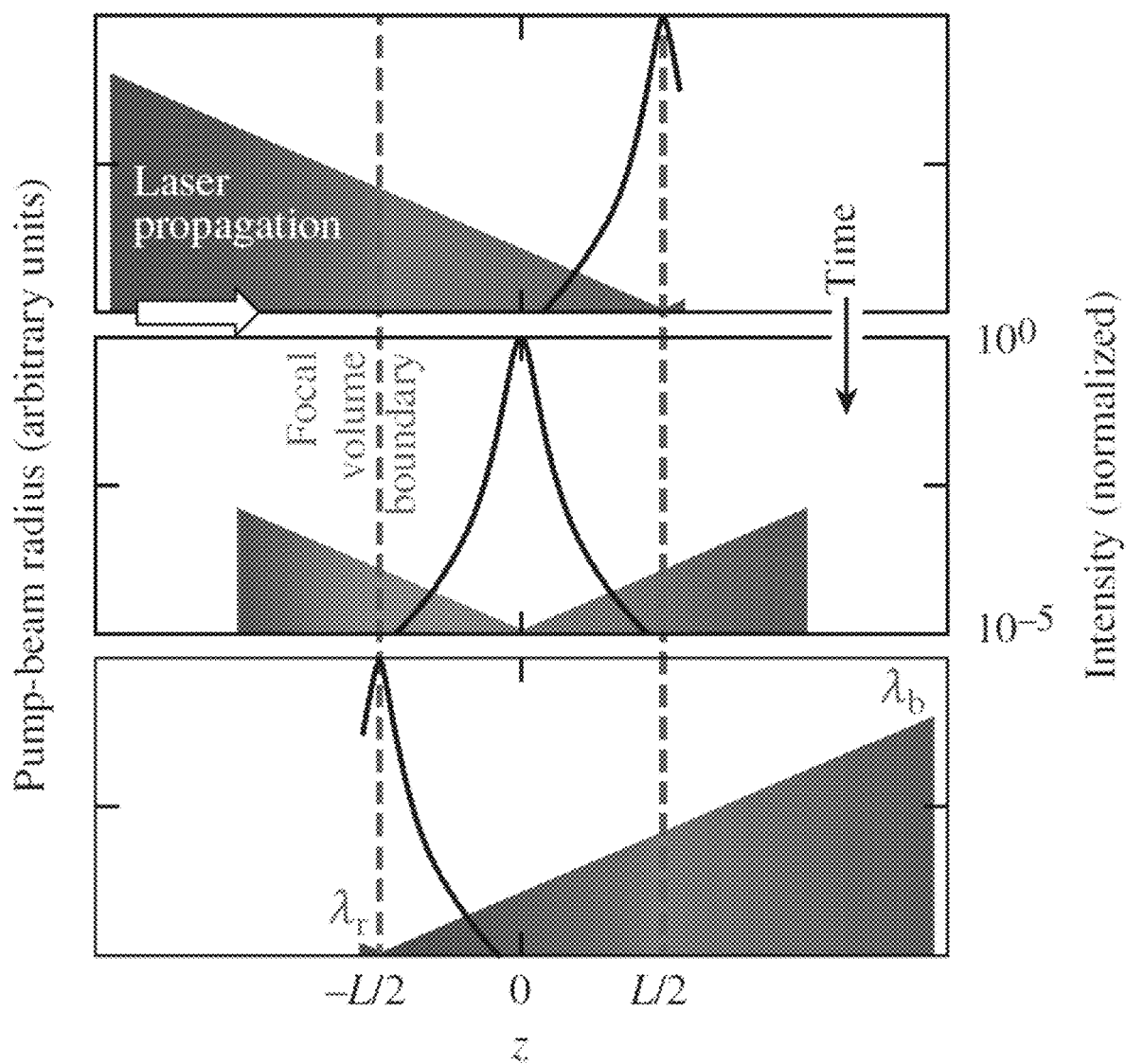

FIG. 10 shows a negatively linearly chirped pump combined with a chromatic focusing system causes the high-intensity focus to propagate backward at v≈−c when the pump duration is 2L/c, where L is the distance between the focii of the pump's bandwidth extrema. The solid black curve represents the instantaneous on-axis intensity profile.

Figure 11:
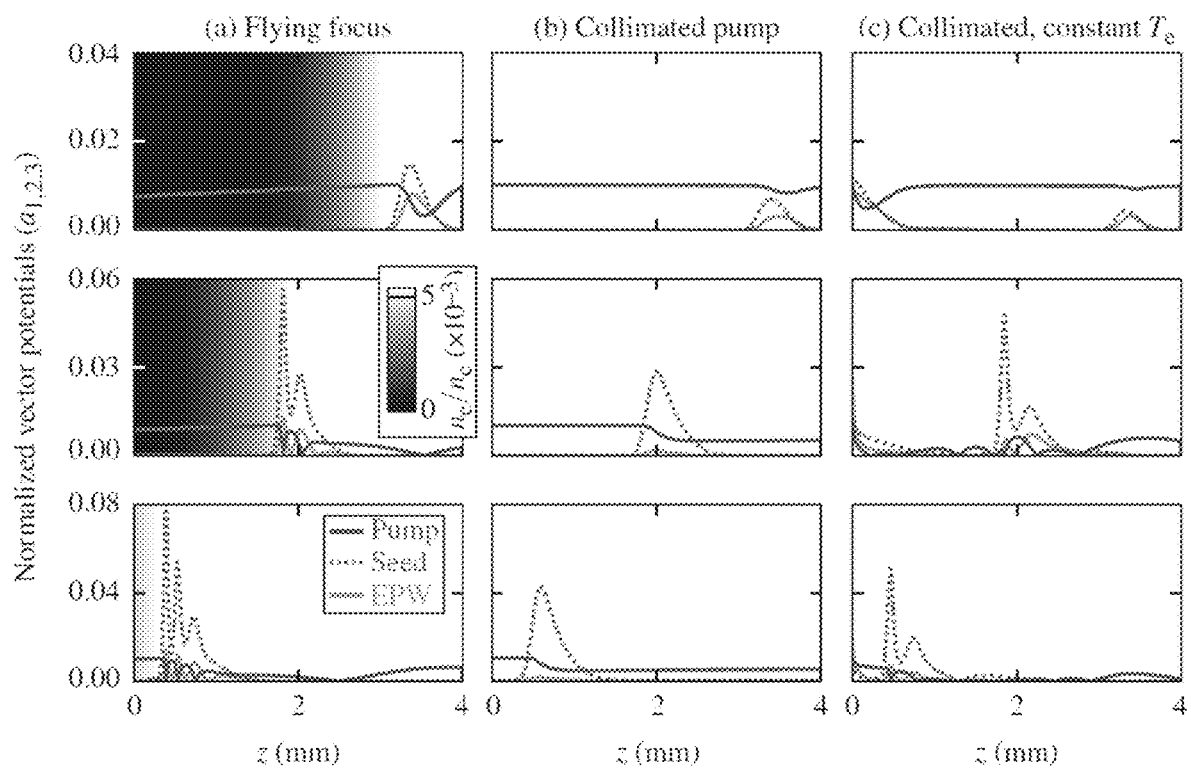

FIG. 11. Results of three-wave model simulations. (a) With the flying focus, the pump first reaches high intensity at the right edge, where ionization is initialized. Constant intensity moves at v=−c as different colors converge to different locations, so the ionization wave propagates at a nearly fixed distance ahead of the injected seed pulse. Ideal plasma amplifier behavior is observed. (b) When the pump is collimated within the interaction region and above threshold for ionization, the seed encounters higher temperatures along nearly its entire path, which reduces growth via increased Landau damping. (c) With a collimated beam as in Case 2 but holding $T_e$ fixed to be similar to Case 1, spontaneous SRS grows during the long time in which the pump propagates across the ionized plasma. Premature pump depletion degrades the resulting seed amplification. FFRA Case 1 with noise initialized at the same level did not produce such precursors.

Figure 12:
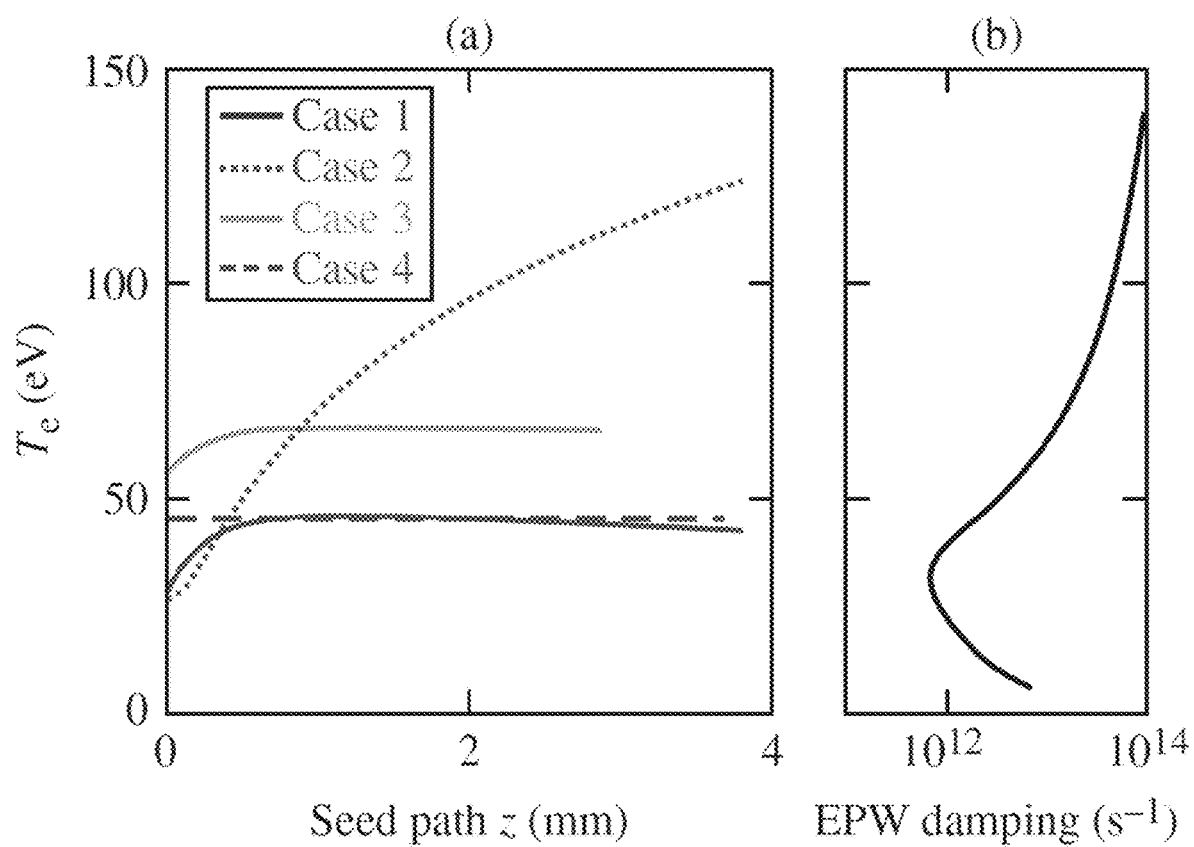

FIG. 12. (a) In Case 1, the temperature encountered by the seed was nearly constant everywhere because of the ionization wave propagating ahead of the seed. In Case 2, the seed encountered progressively higher temperatures because each slice of plasma was heated for a longer duration. Case 3 used the flying focus (like Case 1) but delayed the seed injection by 3 ps, which shows that $T_e$ is tunable. Case 4 used a collimated pump (like Case 2), but $T_e$ was artificially fixed to be similar to case 1; this case illustrates the negative effect of precursor growth. (b) The electron plasma wave damping is minimized around $T_e \approx 40$ eV, so the Flying Focus Raman Amplification scheme can be tuned to operate close to this temperature.

Figure 13:
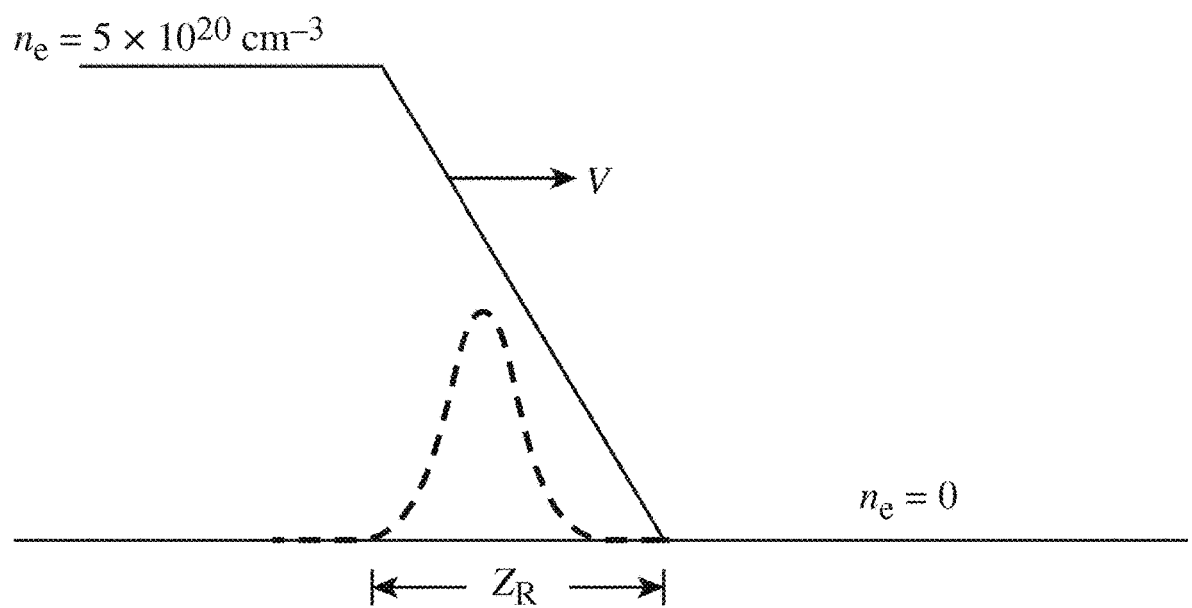

FIG. 13 is a diagram depicting a propagating ionization wave and a co-propagating photon beam injected into the ionization wave. The velocity of the ionization wave is determined by the velocity of the flying focus, which is designed to be equal to the group velocity of the accelerating photons.

DETAILED DESCRIPTION OF THE DISCLOSURE

Figure 1:
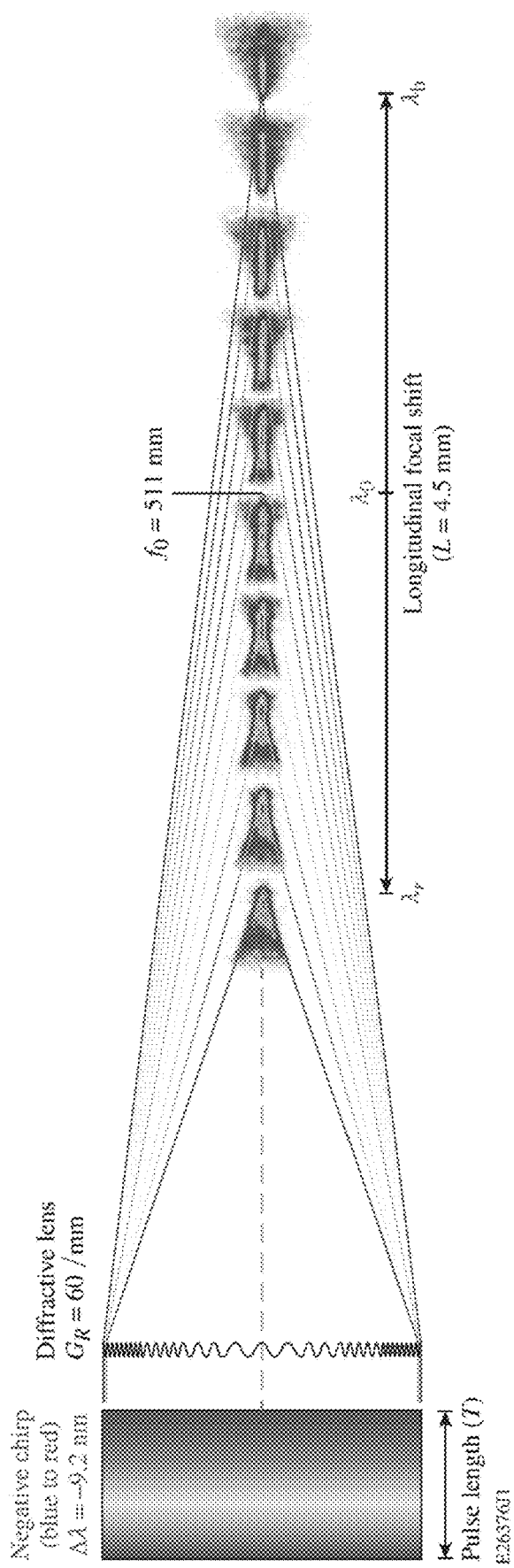
FIG. 1 is a schematic of the chromatic lens system coupled to a spectrally chirped laser pulse according to an embodiment of the present disclosure, wherein measurements of the temporal evolution of the intensity at various longitudinal locations along the focus are shown and a negatively chirped pulse is shown where the colors change in time from blue to red.

The presently disclosed technique for a "flying focus" is an advanced focusing scheme, where a chromatic focusing system is combined with, for example, chirped laser pulses to enable a small-diameter laser focus to propagate nearly 100× its Rayleigh length while decoupling the speed at which the peak intensity propagates from its group velocity. This unprecedented spatiotemporal control over the laser's focal volume allows the laser focus to co- or counter-propagate along its axis at any velocity. Experiments validating the concept measured subluminal (−0.09c) to superluminal (39c) focal-spot velocities, generating a nearly constant peak intensity over 4.5 mm. The flying focus allows simple, compact systems to exert novel control over laser-plasma interactions and presents opportunities to overcome current fundamental limitations in laser-plasma amplifiers, laser-wakefield accelerators, photon accelerators, and high-order frequency conversion. FIG. 1 shows a schematic of an exemplary system that generates a flying focus according to the present disclosure.

Figure 2:
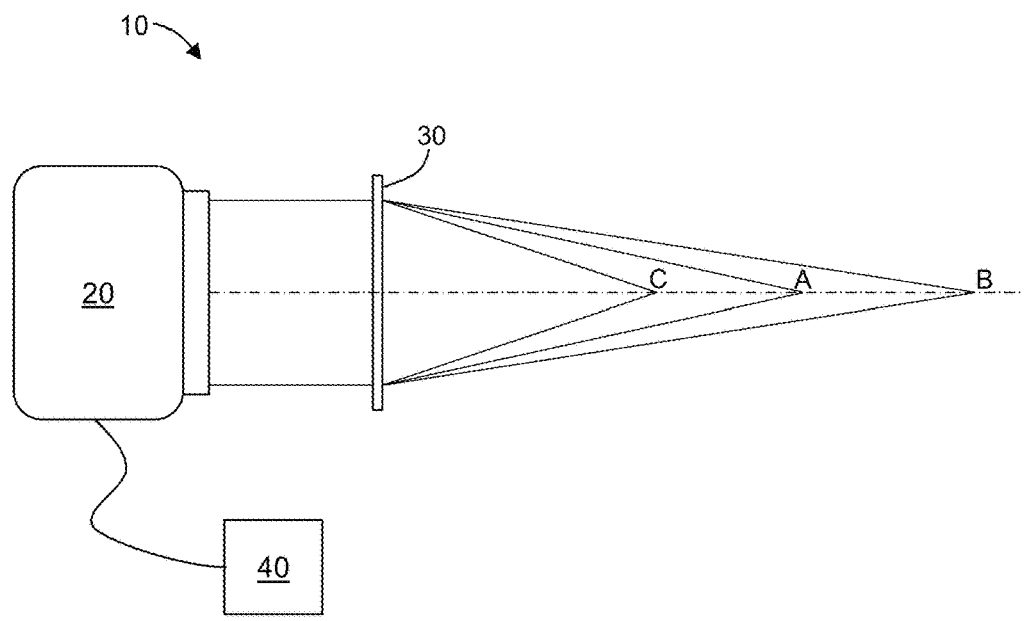
FIG. 2 is a diagram of an apparatus for providing a flying focus according to another embodiment of the present disclosure.
Figure 3:
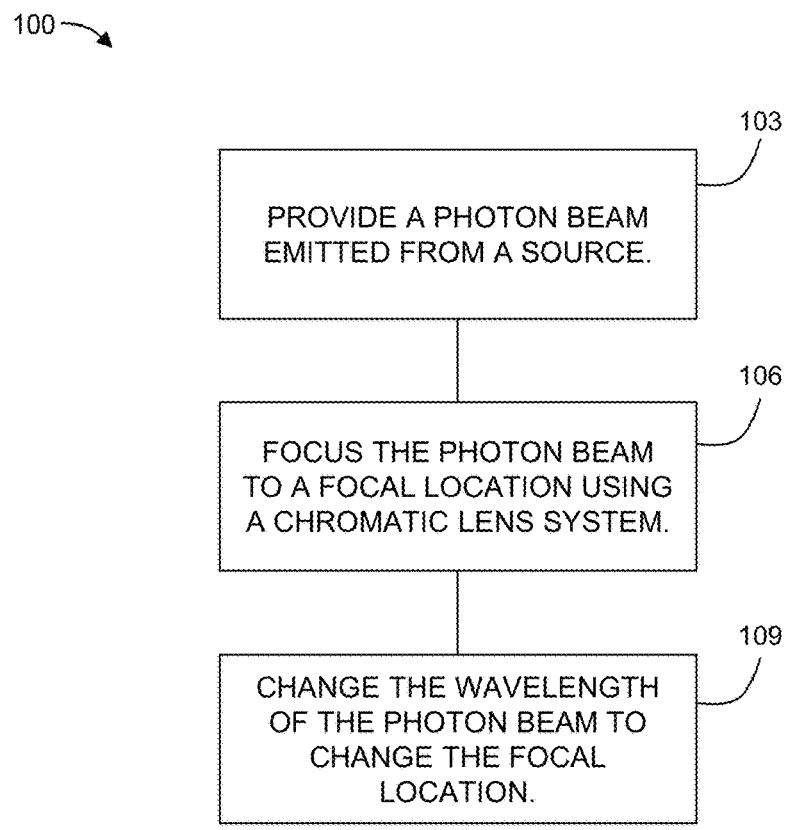
FIG. 3 is a chart depicting a method according to an embodiment of the present disclosure.

With reference to FIGS. 2 and 3, the flying focus can be embodied as, for example, a method 100 of spatiotemporally changing a focal location of a photon beam as a function of time (FIG. 2) and an apparatus 10 for providing a flying focus (FIG. 3). The method 100 includes providing 103 a photon beam emitted from a source 20. The photon beam has a wavelength (λ). The photon beam may be a laser beam, such as, for example, a broadband laser beam emitted from a laser. In some embodiments, the photon beam may comprise a plurality of co-propagating laser beams. For example, a plurality of single-wavelength lasers may be combined using a grating to generate the photon beam. Exemplary embodiments of photon beams using lasers are used throughout the present disclosure for convenience and the scope of the disclosure should not be limited to such embodiments.

The photon beam is focused 106 to a focal location (indicated as 'A' in FIG. 2) using a chromatic lens system 30. The focal location is at a first longitudinal distance (z) from the chromatic lens system along an optical axis (i.e., the focal location is the focal length of the chromatic lens system). It should be noted that a chromatic lens system is characterized by having a focal length which differs depending upon the wavelength of the photons being focused. This characteristic is generally an aberration that practitioners traditionally desire to correct from lens systems. Instead, the presently-disclosed technique takes advantage of this "chromatic aberration" so as to create a focal location of a beam which can be altered (spatially) by altering the wavelength of the beam.

An exemplary chromatic lens system includes a diffractive lens. For example, a diffractive lens with a radially varying groove density $$G = \frac{r}{\lambda_0 f_0}$$

may be used to produce a chromatic focus, where $f_0$ is the focal length of the system at the central wavelength $\lambda_0$ and r is the distance from the optical axis. With this embodiment of a lens, the longest wavelength ($\lambda_r$) focuses a length $$L \cong f_0 \frac{\Delta\lambda}{\lambda_0}$$

before the shortest wavelength ($\lambda_b = \lambda_r - \Delta\lambda$). Other embodiments of a chromatic lens system may comprise a refractive lens that is engineered to focus different colors at different locations (i.e., a chromatic refractive lens). Still other embodiments of a chromatic lens system comprise both a diffractive lens and a chromatic refractive lens.

The method 100 includes changing 109 the wavelength of the photon beam (as a function of time) so as to change the focal location (as a function of time). For example, with reference to FIG. 2, the focal location A may be moved to focal location B or focal location C. For example, the wavelength may be changed 109 such that the focal location changes with a focal velocity (v). The wavelength may be changed by, for example, a controller 40 configured to change a wavelength of the photon beam as a function of time to change the focal location as a function of time. By introducing a laser pulse with a temporally varying wavelength, the focus will move at a velocity given by v(z)=dz/dt, where dz is the distance between two focused colors spectrally separated by $\delta\lambda$; dt=d$\tau$+dz/c is the time it takes for the two colors to reach their respective focii; d$\tau$ is the time between the two colors ($\delta\lambda$) within the chirped laser pulse, and c is the speed of light. By changing the chirp of the laser beam, the time to reach focus for successive colors is varied to provide control of the focal velocity. In general, the velocity of the focus is given by:

$$v(z)/c = \left[1 + \left(\frac{d\lambda}{d\tau}\right)^{-1} \left(\frac{dz}{d\lambda}\right)^{-1} c\right]^{-1}, \quad (1)$$

where $$\frac{dz}{d\lambda} \cong -f_0/\lambda_0$$

is the longitudinal dispersion provided by the diffractive lens, $$\frac{d\lambda}{d\tau}$$

is the rate at which the colors in the photon pulse change, and $\Sigma$=t–z/c.

Moreover, a trajectory (z(t)) of the focal location (sometimes referred to herein as the focal spot) may be designed where:

$$\frac{\lambda(\tau)}{\lambda_0} = \left[1 - \frac{z(\tau)}{f_0}\right]^{-1} \approx \frac{z_0(\tau)}{f_0}. \quad (2)$$

For a trajectory with a constant velocity, z(t)=$v_0$t, a linear temporal variation in wavelength may be used, $\pi(\tau)$=($v_0\lambda_0$/ $f_0$)$\tau$+$\lambda_{r,b}$ where $v_0$=L/T, $\lambda_{r,b}$ is the initial wavelength, T is the total pulse duration, and |$\tau$|<T/2.

Figure 4:
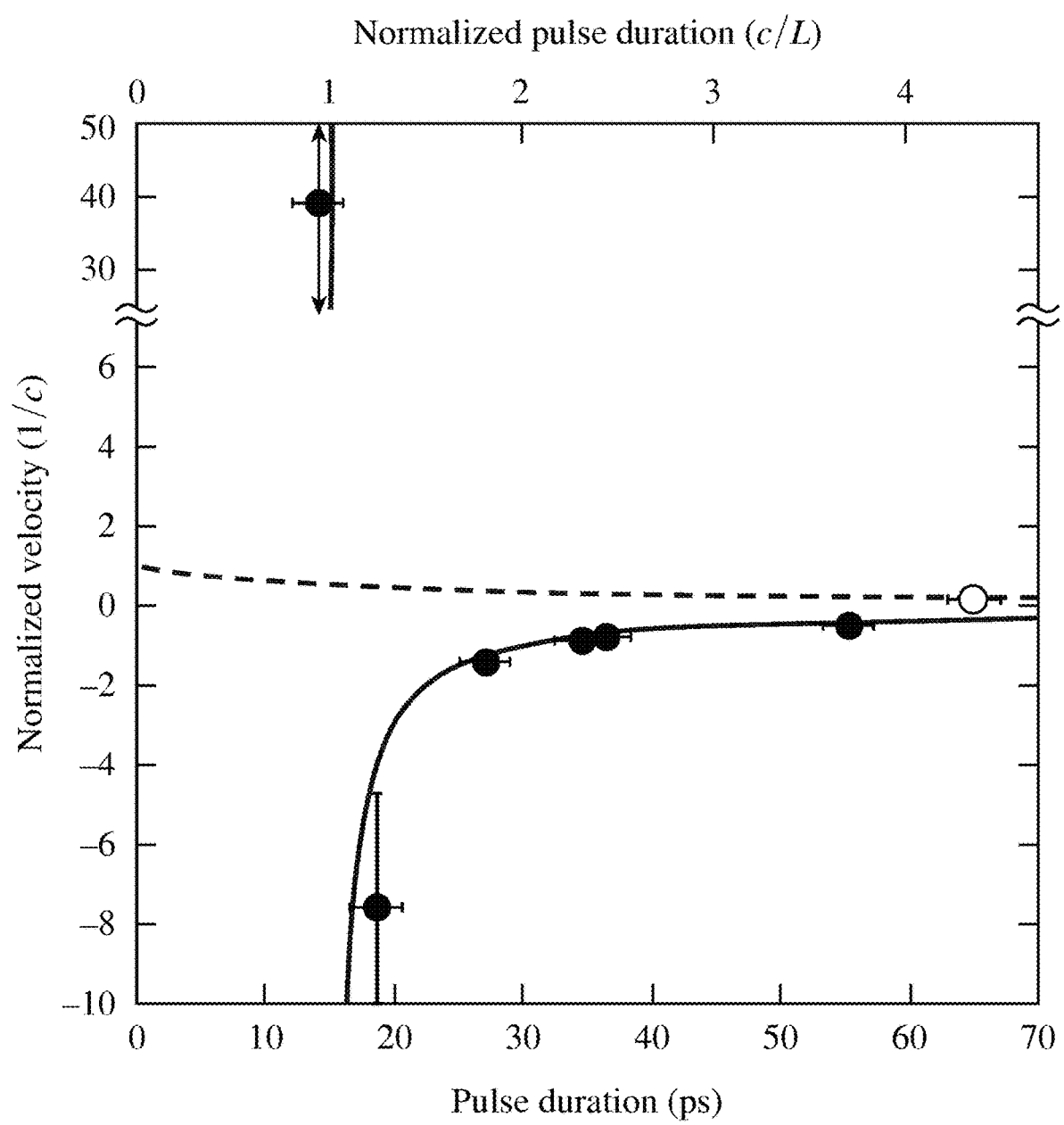
FIG. 4 is a graph showing the measured (points, bottom axis) and calculated $$\left[ v/c = \left(1 \pm \frac{cT}{L}\right)^{-1} \right]$$

FIG. 4 shows the velocity of the flying focus (Eq. (1)) for a linearly chirped laser beam (d$\lambda$/d$\tau$=$\Delta\lambda$/T). When the wavelengths are arranged in time where the longest wavelength comes first (positive chirp), the focal spot propagates in the forward direction (i.e., away from the diffractive lens) at subliminal velocities. For a negatively chirped laser beam (i.e., when the shortest wavelength comes first), any focal-spot velocity is available. When the pulse duration of the laser is equal to the transit time of the light to propagate across the focal region (T=L/c), all of the colors focus simultaneously, generating a long line focus; from Eq. (1) this corresponds to an "infinite" focal velocity.

The flying focus was demonstrated experimentally by measuring the temporal evolution of the focal-spot intensity at various longitudinal locations. From these measurements, the velocity of the focal spot was determined and compared with the theory. The following sections describe the experimental setup where the Laboratory for Laser Energetic's Multi-Terawatt (MTW) laser was used to demonstrate the flying-focus concept. This demonstrates the main results where the laser pulse duration was varied with unprecedented control of the focal volume.

Experimental Setup of an Exemplary Embodiment

MTW is a Nd:glass optical parametric chirped-pulse-amplification laser with a central wavelength of $\lambda_0$=1054 nm. The bandwidth ($\Delta\lambda$=9.2 nm full width at 0.1× maximum) was stretched to produce a 2.6-ns linear chirp, and a set of compressor gratings subsequently compressed the pulse to the desired chirped-pulse duration. Undercompression relative to the transform-limited pulse duration resulted in a positive linear chirp ($\lambda(\tau)$=($\Delta\lambda$/T)$\tau$+$\lambda_r$) and overcompression resulted in a negative linear chirp ($\lambda(\tau)$=–($\Delta\lambda$/T) $\tau$+$\lambda_b$). A diffractive lens with a focal length of $f_0$=511 mm (at $\lambda_0$) generated an ~15-µm-diam focus with a longitudinal separation of L=4.5 mm between the extreme wavelengths. This focal region was nearly 100× the Rayleigh length ($Z_R$=0.05 mm) of the f/7 system.

The velocity of the focus over the longitudinal separation was determined by measuring the radial intensity profile along the laser beam's axis as a function of time. The experiments used a parallel-path configuration (FIG. 5), where the collimated laser beam (R=3.5 cm) was split into two identical beams to form signal and reference paths that then imaged onto a P510 Rochester optical streak system (ROSS) camera. Inside one of the parallel paths, the signal path was focused by the diffractive lens ($f_0$=511 mm) and the reference path was focused by an achromatic lens with an $f_1$=400-mm focal length. Both legs used achromatic lenses ($f_{r,s}$=400 mm) to collimate the light that was then recombined with a slight angle to separate the images at the detector plane. The beams were focused to the detectors with a final achromatic lens ($f_2$=400 mm) that produced an image of the reference and signal focal regions. Modeling indicated that the optical system was ~3× diffraction limited (~15 µm) over the wavelength range of interest. The spatial resolution at the detector plane of the ROSS camera was ~50-µm full width at half maximum (FWHM). The reported pulse duration (T) was determined using the reference pulse measured on the ROSS camera. The impulse response of the streak camera was measured to be 7-ps FWHM.

The diameter of the signal pulse as a function of longitudinal position (z) along the longitudinal focal length was determined by moving the collection lens ($f_s$) over successive positions spanning slightly beyond the range of extreme focal positions. At each z position, several images were recorded by the streak camera (FIG. 6) and averaged to increase the signal-to-noise ratio. The reference pulse was used to remove jitter between images. Each composite image generated a measurement of the time between the reference pulse and the signal pulse ($\tau$).

FIG. 6 shows the results for a negatively chirped laser pulse with a duration of T=36.4±1 ps. The images indicate that the focal spot counter-propagated at a velocity of –0.77c±2%. When measuring the focal spot at a position closest to the diffractive lens (z=–1.5 mm), the diameter of the flying focus was measured to evolve in time from a large spot size to a best-focus spot size over the pulse duration (i.e., the laser spot does not come to focus until the end of the laser pulse). This is in contrast with the measurements that image a position 3.0 mm farther from the diffractive lens (z=1.5 mm). In this case, the focal-spot size was measured to start at its best focus and expand to a maximum diameter over the duration of the laser pulse (i.e., the laser spot starts at focus and expands until the end of the laser pulse).

The velocity of the focus $\{v=\Delta z/\Delta t=c[1+(\Delta\tau/\Delta z)c]^{-1}\}$ was determined by measuring the time of minimum foci ($\tau$) at each image plane (z). The slope of a best-fit line to the measured data (FIG. 6 (bottom)) was used to determine $m=c\Delta\tau/\Delta z$. The error in the measurements shown in FIG. 6 is given by $\delta v/v=v\delta m$, where $\delta m$ is the uncertainty in each fit.

Results

FIGS. 7A and 7B show measurements of the flying focus generated by both a negatively (FIG. 7A) and a positively (FIG. 7B) chirped laser pulse. The initial frame of the negatively chirped pulse shows the laser beam entering focal region, but before it has reached focus. Over the next 20 ps, the laser reaches a focus at the far end of the system (z~2 mm). This is in contrast with the positively chirped pulse, where the laser comes into focus initially at the front of the measurement window (z~−2 mm). Comparing the middle row for each data set shows that the focal spots are propagating in opposite directions. For the negatively chirped pulse, the peak intensity moved back toward the lens by $\Delta z$~2 mm over the ~20 ps corresponding to a velocity of −0.3c, while for the positively chirped pulse, the peak intensity moved forward by about the same distance in a comparable time corresponding to a velocity of about +0.2c. FIGS. 7A and 7B was constructed from temporal measurements of 30 longitudinal locations ranging from z=−3.75 mm to z=+3.75 mm. The measured images were sliced into temporal bins and recombined given their focal location and measured time (t).

The measured velocity of the focus as a function of the pulse duration of the laser compares well with the calculations using Eq. (1) (FIG. 4). The results show that when the laser pulse was negatively chirped with duration of T=34.4 ps, the focal spot counter-propagated at a velocity of v=−0.87c±2%. Reducing the pulse duration (T=18.6 ps) resulted in a counter-propagating superluminal focus (v=−70.6c±20%). Extending the pulse duration to T=232 ps slowed the focal spot propagating at v/c≅−0.09±1%. When the pulse duration was just less than the transit time of the light to propagate across the focal region, the focus was measured to propagate at nearly 50× the speed of light. A positive chirp provides access to a range of forward-propagating subluminal velocities. The focal-spot velocity for a positively chirped laser pulse with a duration of T=65 ps was measured to propagate at v=0.20c±1%.

FIG. 8 shows snapshots of the longitudinal intensity profiles for three different negative chirp cases. They illustrate propagating backward at the speed of light (FIG. 8(a)), propagating instantaneously across the focal volume (FIG. 8(b)), and propagating forward faster than the speed of light (FIG. 8(c)). They were calculated by assuming Gaussian optics, $$\frac{I(z,t)}{I_0} = \left(\frac{w_0}{w(z,t)}\right)^2,$$

where $w_0 \cong \frac{1}{2}G_R$ is the diffraction-limited spot size and $$w(z,t) \cong w_0 \sqrt{1 + \frac{f_0^2}{4Z_R^2}\left[\frac{z}{f_0} + \frac{\lambda_0}{\lambda(\tau)} - 1\right]^2} \quad (3)$$

is the radius of the flying focus spot. The Rayleigh length for a diffractive lens is given by $$Z_R \cong \frac{f_0^2 \lambda_0}{4R^2} \cong \frac{1}{4G_R^2 \lambda_0} = 52 \ \mu m,$$

where $G_R$ is the groove density at the radius of the laser beam (R). This is a reasonable approach to calculating the intensity profile provided that the pulse duration is much larger than the radial pulse front delay (T>$T_{RPFD}$=5 ps).

The intensity of the flying focus across the longitudinal focal region is given by the spectral power, $$I(z,t) = \frac{P(\lambda)}{\pi[w(z,t)]^2},$$

which shows that the longitudinal intensity can be controlled by spectrally shaping the laser pulse.

To show further control over the intensity, 1.6 nm of bandwidth was removed from the middle of a positively chirped spectrum, demonstrating that the laser did not focus over the central region of the longitudinal focus. The measured laser focus propagated subluminally (v/c=0.16±1%) over the first ~2 mm and then did not focus again for ~26 ps, at which time the focus reappeared at z~2.8 mm and propagated to the end of the longitudinal focal region.

Laser Amplifier Using Stimulated Raman Scattering in Plasma with a Flying Focus

Applying the flying focus to a laser-plasma amplifier will allow the ionizing pump laser intensity to propagate at v=−c in order to generate a counter-propagating ionization wave just ahead of the amplifying seed pulse over a distance that is many times the system's Rayleigh length. This will mitigate precursor growth driven by the pump beam and enable one to control the plasma conditions observed by the seed. The flying focus could be the enabling technology for an efficient laser-plasma amplifier.

Plasma-based laser amplifiers utilizing either stimulated Raman scattering (SRS) or strongly coupled stimulated Brillouin scattering have long been of interest. Lacking a damage threshold, compact plasma-based systems could produce unfocused intensities I≈$10^{17}$ W/cm$^2$—more than six orders of magnitude larger than conventional systems. Typically, a moderate intensity pump pulse with a duration of at least 2L/c propagates across a plasma of length L. When the pump's leading edge reaches the end of the plasma, an initially weak seed pulse is injected in a counter-propagating geometry. Tuned to satisfy the Manley-Rowe frequency and wave number matching conditions, the beat wave between the two beams drives a plasma wave that mediates energy transfer from the pump to the seed. While early experimental efforts on Raman-based plasma amplifiers appeared promising, progress has slowed and numerous attempts have been made recently to elucidate the shortcomings of experiments. A consensus is emerging that thermal effects and the amplification of precursors growing from noise ahead of the seed pulse—issues that are both related to the pump's traversal of ionized plasma prior to meeting the seed—may be among the most pervasive issues degrading performance.

FIG. 10 shows a schematic of a Raman amplifier with a flying focus. The pump beam has a negative linear chirp and a pulse duration that is equal to T=2L/c, where L is both the length of the focal region spanned by its bandwidth as well as the length of the amplifier interaction region. In this case, intensity isosurfaces propagate backward at v≈−c (c.f., FIG. 4) over a length that can be many times the Rayleigh length. While FIG. 10 demonstrates the propagation of high intensity at best focus for the laser, lower intensity isosurfaces (that nevertheless propagate at v≈−c) can be exploited by displacing the interaction region from the region of best focus.

To demonstrate the benefits of this concept, the coupled three-wave equations describing SRS in plasma were solved numerically. Such models have previously been benchmarked against particle-in-cell simulations and found to be in good agreement when plasma wave amplitudes were kept below the wavebreaking limit and kinetic effects could be ignored (at $k_3\lambda_D \leq 0.3$ where $k_3$ is the electron plasma wave's (EPW) wave number and $\lambda_D$ is the Debye length). The three-wave model was supplemented with a field ionization model to simulate the plasma ionization by the pump. The basic three-wave equations are:

$$(\partial t - v_1 \partial x + v_1)a_1 = Ka_2 a_3,$$

$$(\partial t - v_2 \partial x + v_2)a_2 = -Ka_1 a_3^*,$$

$$(\partial t - v_3 \partial x + v_3 + i\delta\omega)a_3 = -Ka_1 a_2 + S_3, \quad (4)$$

where the subscripts 1, 2, and 3 refer to the pump, the seed, and the EPW, respectively; $v_j$'s are group velocities; $v_i$'s are damping rates; $K=\omega(n_e/n_c)^{1/4}/2$ is the wave coupling parameter, where $n_e$ is the electron density and $n_c$ is the critical density; $a_{1,2}=0.855\times10^{-3}\lambda_{1,2}$ [μm] $\sqrt{I_{1,2}[\text{W/cm}^2]}$ are normalized laser vector potentials, and $a_3=|e|\langle E_3\rangle/m_e c\sqrt{\omega\omega_{pe}}$ is the normalized envelope of the EPW, with pump frequency ω and EPW frequency $\omega_{pe}$. Advection of the plasma wave can be neglected ($v_3 \approx 0$), and here detuning was also neglected (δω=0) since it has been explored extensively elsewhere. The pump and seed are damped collisionally, $v_{1,2}=v_{ei}\omega_{pe}^2/\omega^2$ where $v_{ei}=2.9\times10^{-6}Zn_e$ [cm$^{-3}$] $\Lambda T_e$ [eV]$^{-3/2}$ and Λ is the Coulomb logarithm; $v_3=v_{ei}+v_l$ includes both collisional absorption and collisionless (Landau) damping for the EPW, with $$v_l = \sqrt{\pi/2}\, \frac{-\omega_{pe}^4}{(k_3 v_e)^3}\exp\left[\frac{-\omega_{pe}^2}{2(k_3 v_e)^2}\right].$$

$S_3$ is a noise term that is included to investigate spontaneous SRS growing from undriven plasma fluctuations. Following previous work, $S_3 = c_1 v_3 T_e$ is assumed to be proportional to the EPW damping rate and electron temperature, but a multiplier $c_1$ was added to test the sensitivity to the initial noise level. Experiments often find that plasma fluctuations are elevated over the expected thermal levels.

The three-wave model was supplemented with an ionization model to simulate the plasma ionization by the pump:

$$\partial_t n_e = n_n w(a_1),$$

$$\partial_t n_n = -n_n w(a_1), \quad (5)$$

where $n_n$ is the neutral gas density and $w(a_1)$ is the ionization rate that depends on the local pump intensity. In the regime of interest, the Keldysh formula is valid. For $\gamma=\sqrt{2U_I/m_e c^2}/a_1 \gg 1$, where $U_I$ is the ionization potential, the multiphoton ionization rate $w(a)\cong\omega N^{3/2}(2\gamma)^{-2N}$ is appropriate, where $N=1+\text{Int}(U_I/\hbar\omega)$ is the number of photons required to overcome the ionization potential. For $\gamma \ll 1$, the tunneling formula is more accurate:

$$\omega(a) \cong 4\Omega_0 \left(\frac{U_1}{U_H}\right)^{\frac{5}{2}} \frac{a_H}{a_1} \exp\left[-\frac{2}{3}\left(\frac{U_1}{U_H}\right)^{\frac{3}{2}} \frac{a_H}{a_1}\right],$$

with atomic frequency $\Omega_0 \cong 4.1\times10^{16}$ s$^{-1}$, hydrogen ionization potential $U_H=13.6$ eV, and the hydrogenic electric field normalized vector potential $a_H \approx 3.05\times10^{14}/\omega$. An exponential fit was used to fill in the region between the multiphoton and tunneling regimes. The molecular nature of hydrogen was approximated by using the molecular ionization potential $U_I=U_{H_2}=15.4$ eV. To conserve energy, an additional damping term on the pump was added to the wave equations given above in Eq. (4) by balancing the equation, $$n_c \frac{m_e c^2}{2}\partial_t a_1^2 = -(U_1 + \epsilon)\partial_t n_e,$$

where $\epsilon E=m_e v_{osc}^2/2$ is the assumed birth energy and $v_{osc}$ is the oscillation velocity of electrons in the pump laser's electric field. The electron temperature was initialized locally at the birth energy, but it can subsequently evolve to balance collisional absorption of the pump and seed.

For all of the simulations, the initial density of hydrogen atoms was $6\times10^{18}$ cm$^{-3}$ and the interaction length was 4 mm, defining a pump duration of 26.7 ps. The pump wavelength was λ=1 μm and the seed was upshifted by the EPW frequency. For the flying focus Raman amplification (FFRA) base case, the pump focusing system was f/5 with the focus of each color located past the interaction region. To simulate focusing in this 1D model, the pump entered from the left edge and its intensity increased as it propagated to the right in a manner that is consistent with the f/# of the system. The blue leading edge of the pump converged to a spot diameter of 400 μm at the exit of the interaction region, where the intensity was set to be I=1.4×10$^{14}$ W/cm$^2$.

In the simulations, the plasma mediating the energy transfer was formed by the pump beam ionizing the hydrogen gas within the interaction region. The ionization threshold of hydrogen is very close to the optimal pump intensity in systems designed for λ≈1 μm lasers. Since the pump first reached this intensity at the right edge of the amplifier in the case of FFRA, plasma was initialized there and an ionization wave subsequently propagated backward with the intensity isosurface. The setup can therefore be tuned such that the plasma is formed just before the seed arrival at every point along the interaction region.

The peak of a 500 fs-duration (full width at half maximum) seed pulse with an initial intensity I=1×10$^{11}$ W/cm$^2$ was injected at the right edge just after the arrival of the pump's leading edge (t=14 ps). FIG. 11(a) shows three snapshots of the interaction as the injected seed traveled from right to left across the interaction region for the FFRA case. The first frame shows that the gas was only ionized ($n_e/n_c > 0$) close to the right edge where the pump first reached high intensity. The seed duration stretched as it grew in the linear regime. From the first to the second frame, it is clear that the ionization wave propagated at an approximately fixed distance ahead of the seed. The nonlinear pump-depletion regime was reached, with seed pulse compression and the formation of a secondary peak. This efficient amplification continued in the final frame. These results demonstrate the ideal behavior that is expected when the seed enters unperturbed plasma and competing instabilities are avoided.

Contrast FIG. 11(a) with the behavior observed in FIG. 11(b), which shows the results from a Raman amplifier without the flying focus. In this case, the intensity was set to I=$1.4 \times 10^{14}$ W/cm$^2$ at the left edge of the amplifier and it was assumed to be collimated as it propagated from left to right (consequently, the pump intensity seen by the seed pulse is nearly the same in both cases). The first frame shows that upon reaching the right edge, the plasma was ionized everywhere throughout the interaction region. While growth in the first frame was comparable, it slowed rapidly compared to FFRA. Pump depletion and pulse compression failed to occur in this case.

The difference can be understood by looking at the electron temperature encountered by the peak of the seed pulse versus time (FIG. 12(a)). FFRA is Case 1, where after a brief initial growth period, $T_e$ leveled off at ≈45 eV because of the nearly constant duration of plasma heating by the pump prior to the seed's arrival at each point along its path. With standard focusing (or a preformed plasma), the seed encountered plasma that was heated for progressively longer durations as it propagated, producing a strong gradient in $T_e$ (Case 2). This model captures the fact that excessive heating can lead to debilitating levels of collisionless Landau damping, which acts to suppress the seed growth. FIG. 12(b) shows the sum of collisional and collisionless damping as a function of temperature. The former dominates at low temperatures and the latter at high temperatures; FFRA "Case 1" is close to the temperature at which EPW damping is minimized.

Note that there could be additional impacts of elevated temperature that are not captured by this model. The thermal gradient seen by the seed pulse can lead to resonance detuning due to the Bohm-Gross frequency shift. Detuning can also result from the kinetic nonlinear frequency shift that accompanies particle trapping. Perhaps most importantly, the wavebreaking threshold is reduced in warm plasma, which limits the plasma wave amplitudes and thereby the energy transfer from pump to seed. This model therefore likely underestimates the adverse effects of high temperature and lack of temperature control with a conventional focusing and ionization scheme.

Given the uncertainties, a temperature of 45 eV may not be optimal. A nice feature of the FFRA scheme, however, is that the temperature can be easily tuned by adjusting the delay between the ionization wave and the injected seed pulse. Many parameters can influence this delay. Holding all else constant but injecting the seed 3 ps later, its peak encounters an electron temperature that is uniformly higher by about 20 eV (c.f., FIG. 12(a), Case 3). Due to the higher temperature, it takes longer to reach pump depletion and the secondary peaks are suppressed. Both the interaction pump intensity relative to the ionization threshold of the gas and the pump's f/# are additional parameters for tuning the delay between ionization and seed injection.

To investigate nonthermal differences between FFRA and standard Raman amplifiers, a Case 4 was run, repeating Case 2 but with a fixed electron temperature ($T_e$=45 eV). Although the seed encountered a similar electron temperature everywhere in Cases 1 and 4, the pump spent a longer time in ionized plasma prior to seed injection in Case 4 compared to FFRA Case 1. The debilitating effect of spontaneous SRS growing ahead of the seed is observed in FIG. 12(c). Although seed growth over the first half of the plasma proceeded in a similar fashion as Case 1, subsequent growth was suppressed due to premature pump depletion and interference with preexisting EPWs. Although noise was included in the same manner in FFRA Case 1, no spontaneous SRS growth was observed due to the limited distance over which it could grow ahead of the seed.

As with temperature, this model likely underestimates the negative impacts of spontaneous SRS. While the zeroth-order effect is competition for pump energy, there is some evidence that saturation of even low-level precursors can corrupt plasma conditions (e.g., with driven ion acoustic waves or modified electron distribution functions) over relatively long time scales. In these situations, the seed does not encounter quiescent plasma and its growth is compromised. The controlled introduction of frequency detuning has been proposed to mitigate precursors without precluding the desirable seed amplification (due to the larger resonance bandwidth of the latter in the nonlinear pump-depletion regime). But despite evidence that modern experiments have been adversely affected by too much frequency detuning, spontaneous SRS continues to be an issue and was recently observed to dominate the overall backscatter as the Raman growth rate was increased.

The use of a chirped pump beam may be used as described above for the flying focus but does introduce some frequency detuning for fixed plasma conditions that could degrade performance. Although it is small $$\left(\frac{\delta\omega}{\omega} \approx 1\%\right),$$

it could be compensated for by introducing a density gradient along the seed path in order to exactly satisfy the frequency matching condition everywhere. While perfect resonance may result in undue levels of spontaneous SRS in a typical plasma amplifier, it would not degrade FFRA due to the alternative means by which FFRA suppresses precursor growth.

Velocity Matching (Photon, Electron, Ion-Accelerators)

For more-exotic applications, the focus can be accelerated by using a nonlinear chirp and/or a nonlinear chromatic optical system. From Eq. (1), the focal velocity could be made to accelerate, decelerate, or oscillate across the longitudinal focal region depending on the design of the nonlinear chirp. This provides an opportunity to decouple the velocity of the focal spot from the group velocity of light in order to match the focal spot velocity with a desired velocity. For example, photon accelerators, harmonic generation in a plasma, particle (electron or ion) accelerators all require the velocity matching of a propagating intensity with an accelerating particle (photon, electron, or ion).

The presently-disclosed flying focus technique provides an avenue for novel control over laser-plasma interactions, removes the need for long-focal-length systems or guiding structures to maintain high intensities over long distances, and decouples the velocity of the focal spot from the group velocity of the light.

Photon Accelerator

An example to demonstrate the impact of the flying focus is a photon accelerator. A photon accelerator frequency up-shifts light using rapidly changing density ($dn_e/dt$). By generating a propagating ionization wave and injecting a co-propagating photon beam into the ionization wave (c.f., FIG. 13), the photons will be frequency shifted according to:

$$\frac{\Delta\omega(t)}{\omega_0'} = \frac{\omega(t)-\omega_0'}{\omega_0'} = \sqrt{1+\left(\frac{\omega_p}{\omega_0'}\right)^2\frac{z(t)}{Z_R}} - 1, \quad (6)$$

where $\omega_0'$ is the initial photon frequency, z(t) is the trajectory of the ionization wave (i.e., the trajectory of the flying focus), and $Z_R$ is an approximate width of the ionization wave. Prior photon accelerator concepts have been limited by phase slippage (a velocity mismatch between the velocity of the ionization wave and the accelerating photons), where the up-shifting laser beam accelerates out of the density gradient.

Generating the ionization wave with a flying focus beam using a nonlinear chirp could mitigate the phase slippage by making the velocity of the ionization wave follow the group velocity of the up-shifting beam, $$\frac{dz}{dt} = v_g(t) = c\sqrt{1 - w_p^2/w(t)^2} \quad (7)$$

where $$w_p^2 = \frac{n_e e^2}{m_e \epsilon_0},$$

$n_e$ is the maximum electron plasma density.

FIG. 9A shows the results from Eq. (6) where photons with an initial group velocity of $v_g$=0.7c were accelerated to $v_g$=0.99c over 4.5 mm (from $\lambda_0'$=1054 nm to $\lambda'$≈160 nm at $n_e$=5×10$^{20}$ cm$^{-3}$). In a standard photon accelerator design where the ionization wave propagates at a constant velocity given by the initial group velocity of the seed photons, the accelerated photons would be limited to $v_g$=0.9c (~550 nm). In this case, the accelerated photons overtake the ionization wave within the first 0.3 mm. The maximum photon energy in a photon accelerator driven by a flying focus is limited by the accelerator length, which is given by the total bandwidth in the laser (L=$f_0$(Δλ/λ)).

FIG. 9B shows the corresponding nonlinear chirp that is required to follow the accelerating trajectory. There are two solutions that both require a negative chirp. The solutions depend on whether the pulse duration of the flying focus is greater than or less than the time it takes for light to transverse the accelerator (T=L/$v_g$≅15 ps). When the pulse duration is longer than the L/$v_g$, the flying focus will counter-propagate with respect to the flying focus beam; when the pulse duration is shorter than L/$v_g$, the flying focus will co-propagate. This nonlinear chirp accounts for the initial rapidly changing group velocity of the accelerating photons (FIG. 9A). Extending the bandwidth to a typical value available in current ultrashort pulse lasers (Δλ/$\lambda_0$≅200 nm/1000 nm) lengthens the accelerator to nearly L≅10 cm, and the accelerated photons reach a final wavelength of 100 nm, assuming the same conditions for the ionization wave as above. The maximum wavelength shift could be significantly increased by using a density ramp to maintain a constant $\omega_p$/$\omega'$(t) as the photons are accelerated.

Laser-Plasma Electron and Ion Accelerator

The flying focus could be used to accelerate charged particles in a plasma without a velocity mismatch between the driving field and the particles (typically called dephasing). In a conventional laser-wakefield accelerator, a high intensity laser focus drives a density fluctuation at the group velocity of the driving laser beam. Electrons injected into the longitudinal electric field generated by the density fluctuations, are rapidly accelerated and over a dephasing length take the driving laser. At the cost of a reduced accelerating field, this is mitigated by reducing the density to increase the group velocity of the light. The flying focus could eliminate dephasing by generating a focal spot that moves at a velocity that matches the accelerating electrons. This separation of the accelerator length from the plasma density will provide larger accelerating fields for a given accelerator length and could expand the options for optimizing laser-plasma accelerators. Furthermore, the flying focus provides an opportunity to load electrons into the accelerating field that are moving significantly slower than the group velocity of light. This enable the possibility of using a laser-plasma accelerator with a conventional electron gun. Electron guns can generate low emittance beams, but the electrons are too slow to be trapped by conventional laser-plasma accelerators. Injecting low emittance electrons into a laser-plasma accelerator could provide a table top electron accelerator with unprecedentedly low emittance.

Remote Sensing

The flying focus could be used to generate counter-propagating THz radiation, which would overcome one of the major limitations of remote sensing. Using a flying focus to generate a counter-propagating focus, THz radiation could be generated by beating the flying focus beam with a second co-propagating beam. The beat wave will generate an electron current in the air/plasma that is expected to produce THz radiation primarily in the direction of the original beams. This is analogous to THz generated by counter propagating two beam laser beams but in the flying focus case, the laser sources and the detectors to be at the same physical location.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method of spatiotemporally changing a focal location of a photon beam as a function of time, comprising:
   providing a photon beam emitted from a source wherein the photon beam has a wavelength (λ);
   focusing the photon beam to a focal location using a chromatic lens system, the focal location is at a first longitudinal distance (z) along an optical axis from the chromatic lens system; and
   changing the wavelength of the photon beam as a function of time to change the focal location as a function of time.

2. The method of claim 1, wherein the photon beam has more than one wavelength and the chromatic lens system is selected to define a focal location for each wavelength which is different than the focal locations of other wavelengths.

3. The method of claim 1, wherein the chromatic lens system is a diffractive lens.

4. The method of claim 3, wherein the diffractive lens has a radially varying groove density $$G = \frac{r}{\lambda_0 f_0},$$

where r is a radial distance from the optical axis, $\lambda_0$ is a central wavelength, and $f_0$ is a focal length at the central wavelength.

5. The method of claim 1, wherein the wavelength is changed such that the focal location changes with a focal velocity (v).

6. The method of claim 5, wherein the focal velocity is described by the equation:

$$\frac{v(z)}{c} = \left[1 + \left(\frac{d\lambda}{d\tau}\right)^{-1}\left(\frac{dz}{d\lambda}\right)^{-1} c\right]^{-1}$$

wherein, $$\frac{dz}{d\lambda}$$

is a longitudinal dispersion of the chromatic lens, $$\frac{d\lambda}{d\tau}$$

is a rate of change of wavelength of the photon beam given by $\lambda(\tau)$, $\tau$ is a time-space coordinate where $\tau = t - z/c$, t is time, and c is the speed of light.

7. The method of claim 1, wherein the focal location (z) is changed over time (z(t)) by changing the wavelength of the photon beam according to $$\lambda(\tau) = \lambda_0 \left[1 - \frac{z(\tau)}{f_0}\right]^{-1},$$

where the chromatic lens system has a longitudinal dispersion given by $$\frac{dz}{d\lambda} \cong -\frac{f_o}{\lambda_0},$$

where $\lambda_0$ is a central wavelength and $f_0$ is a focal length at the central wavelength.

8. The method of claim 1, wherein the source is a broadband laser.

9. The method of claim 8, wherein the laser uses optical parametric chirped-pulse-amplification where $$\frac{d\lambda}{d\tau} \cong \frac{\Delta\lambda}{T} \cong \text{constant}$$

and $\Delta\lambda$ is the laser's bandwidth and T is its total pulse length.

10. The method of claim 1, wherein the wavelength of the photon beam is changed using one or more modulators to enable a rate of change in the laser frequencies to be changed to generate a nonlinear chirp.

11. The method of claim 1, wherein the source is a plurality of single-wavelength lasers.

12. The method of claim 11, wherein the plurality of single-wavelength lasers are combined using a grating to generate the photon beam.

13. The method of claim 1, wherein the chromatic lens system comprises a chromatic refractive lens.

14. The method of claim 1, wherein the chromatic lens system comprises a diffractive lens and a refractive lens.

15. The method of claim 1, wherein a dispersion curve of the chromatic lens system is nonlinear.

16. An apparatus for providing a flying focus, comprising:
    a photon beam source;
    a chromatic lens system configured to receive a photon beam from the photon beam source and focus the photon beam at a focal location;
    a controller configured to change a wavelength of the photon beam as a function of time to change the focal location as a function of time.

17. The apparatus of claim 16, wherein the photon beam comprises more than one wavelength, and the controller changes the wavelength of the photon beam by selecting a subset of the wavelengths.

18. The apparatus of claim 17, wherein the photon beam source is a broadband laser.

19. The apparatus of claim 18, wherein the broadband laser uses optical parametric chirped-pulse-amplification.

20. The apparatus of claim 17, wherein the photon beam source comprises a plurality of single-wavelength lasers.

\* \* \* \* \*